United States Patent [19]

Plante et al.

[11] Patent Number: 4,672,438

[45] Date of Patent: Jun. 9, 1987

[54] TRACKING SIMULATOR

[75] Inventors: Robert Plante, Neufchatel; Daniel Lamarre, Ancienne-Lorette, both of Canada

[73] Assignee: Her Majesty the Queen in right of Canada, Ottawa, Canada

[21] Appl. No.: 876,411

[22] Filed: Jun. 20, 1986

[30] Foreign Application Priority Data

Jun. 28, 1985 [CA] Canada .................................. 485986

[51] Int. Cl.$^4$ ............................................. H04N 7/18
[52] U.S. Cl. .................................... 358/104; 358/125; 358/183; 364/578; 434/111; 434/289
[58] Field of Search .............. 358/104, 125, 126, 183; 364/578, 459, 449; 434/111, 289

[56] References Cited

U.S. PATENT DOCUMENTS

| 4,106,218 | 8/1978 | Polstoroff | 358/104 |
| 4,310,884 | 1/1982 | Roberts | 434/111 |
| 4,457,716 | 7/1984 | Eserhaut | 358/104 |

Primary Examiner—Howard W. Britton
Attorney, Agent, or Firm—Cushman, Darby & Cushman

[57] ABSTRACT

A simulator is used with an optical locking device such as a cinetheodolite to provide inexpensive, convenient operator training. The simulator has a video monitor mounted on the viewer of the theodolite to display simulation images to an operator. A television camera mounted on the main telescope of the theodolite feeds a background image to the monitor. A graphics generator superimposes a target image on the background image. The movement of the telescope is coordinated with the movement of the target image on the monitor to provide a realistic simulation.

16 Claims, 4 Drawing Figures

TRACKING SIMULATOR

FIELD OF THE INVENTION

The present invention relates to a simulator for use with an optical tracking device to provide inexpensive, convenient operator training. The device was developed for use with a cinetheodolite and will described in the following in connection with that application. It is to be understood however, that the invention is to be construed as having general applicability to various types of optical tracking devices.

BACKGROUND

Test establishments using cinetheodolites can gather hundreds of thousands of feet of cinetheodolite film yearly in support of, for example, flight testing programs. In a typical test run, five two-man cinetheodolites may be used to track targets varying from hovering helicopters to rockets travelling at Mach 3. The quality of the information collected is wholly dependent on the tracking skills of the cinetheodolite operators. In the worst case, poor tracking at even one site can result in the loss of all data from a test run. It is therefore apparent that the training of new operators and the maintenance of skills in experienced operators is a high priority.

At present, operator training is carried out by either scheduling test runs exclusively for cinetheodolite tracking training or by laying on extra cinetheodolite sites during actual test runs. Both of these approaches have their drawbacks.

Training runs carried out exclusively for training purposes are costly in terms of aircraft operation, expendable equipment (e.g. rockets) and film development. Additionally, since these training runs must be scheduled days in advance, they cannot be arranged on short notice to fill in for cancelled test runs. Furthermore, the development time for the film is one or two days, a significant delay in providing feedback to an operator, thus considerably reducing the value of the training run.

The use of extra sites for training during actual tests does appear more cost effective, but is subject to certain other disadvantages. For example, the simultaneous manning of the information acquisition sites and provision of experienced operators to assist at training sites is not always possible. In many cases, operators function in pairs that can only be split up at the risk of decreasing the total effectiveness of information collection. This procedure is also subject to the deficiencies of excessive feedback delay. Additionally, most actual test runs cannot effectively be used to provide experienced opertors with refresher training.

The need for a simulator is therefore apparent. The aim of the present invention is to provide an appropriate simulator that is relatively inexpensive and easy to operate.

SUMMARY

According to the present invention there is provided a simulator for use with an optical tracking device of the type having a target tracking sight, at least one operator's station including a viewer for viewing through the sight and sight orientation control means for orienting the sight, the simulator comprising:

video monitor means associated with the viewer for displaying video images to an operator;

a television camera mounted for movement with the sight and with substantially the same field of view as the sight;

sight orientation monitoring means connected to the tracking device for monitoring the orientation of the sight;

graphics generator means for generating a video target image;

electrical circuit means connecting the television camera and the graphics generator means to the monitor to generate at the monitor a composite image of the camera field of view with a superimposed target image, the circuit means further connecting the sight orientation monitoring means to the graphics generator to vary the location of the target image with respect to the field image according to the sight orientation.

Since the simulator is built around an existing tracking device, the simulator response to an operator's commands are the same as those of the actual tracking device during a real test run.

For debriefing and performance evaluation, the signal sent to the operator's monitor can be recorded on video tape and transmitted to nearby television receivers for use as instructor monitors.

BRIEF DESCRIPTION OF THE DRAWINGS

In the accompanying drawings, which illustrate an exemplary embodiment of the present invention.

DETAILED DESCRIPTION

Figure 1:
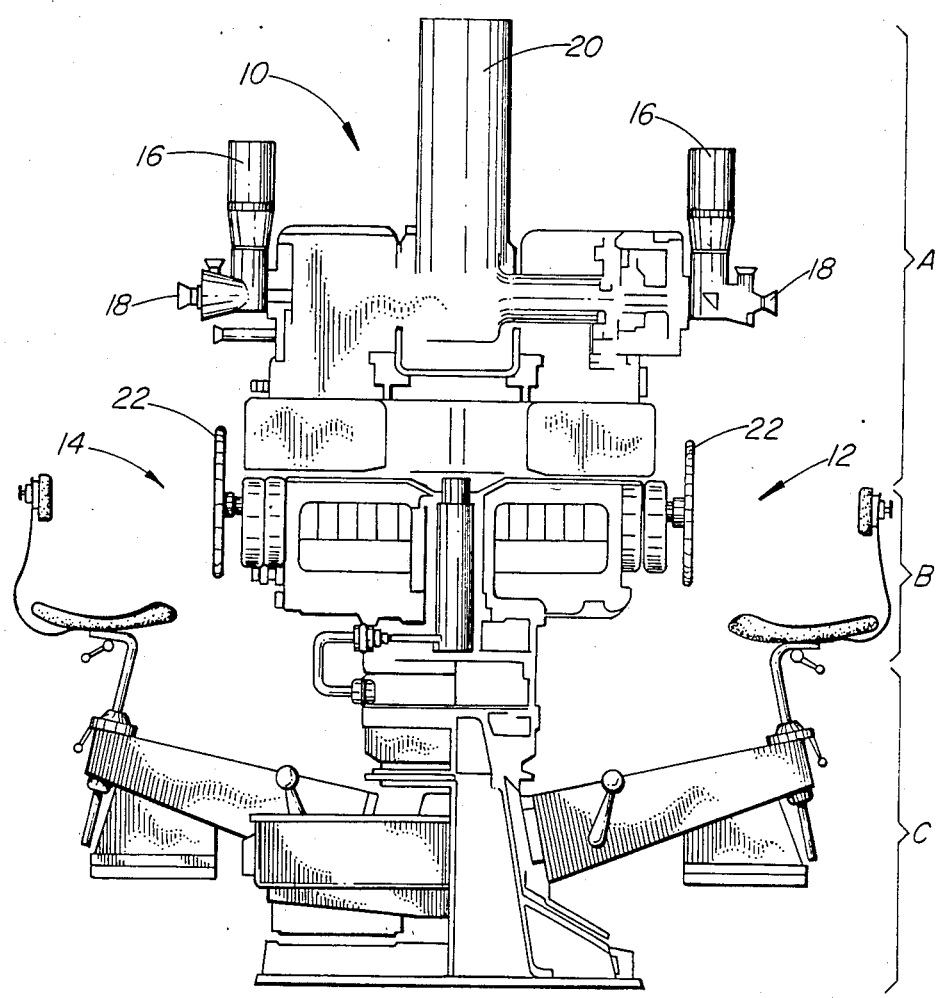
FIG. 1 is an elevation of a cinetheodolite.

Referring to the drawings, and particularly to FIG. 1, there is illustrated a Contraves Model F cinetheodolite. The cinetheodolite has an optical section designated A, a tracking drive control section designated B and a support section designated C. The illustrated cinetheodolite includes two operator stations 12 and 14 located on opposite sides of the theodolite. Each operating station includes a tracking sight in the form of a telescope 16 with a viewer in the form of eyepiece 18. Located between the two tracking telescopes is a main telescope 20 that focuses the target image on a photograph film.

The two operator stations include driving units for azimuth and elevation respectively. Each has a handwheel 22 that controls the operation of the driving unit. The handwheels give the instrument an angular velocity that is proportional to the handwheel deflection from a zero position. The tracking drive control section also includes a slip ring column for routing electrical signals between the rotating sections of the cinetheodolite and the stationary support section C. The support section C holds the upper portion of the cinetheodolite, the bearing support for the rotating seats and the necessary numbering and angle measuring electronics for the apparatus.

In conventional operation of the cinetheodolite, acquisition of the target may be through slaving the driving units to range tracking radars. After acquisition, two operators, using the sighting telescopes and handwheels, control the azimuth and elevation respectively.

The angular velocity of the device is proportional to the deflection of the handwheel from its zero position. The rotary speed of the handwheel also gives the cinetheodolite an additional angular rotation to help it catch up when, for example it is lagging behind a target. A torque, proportional to the angular velocity of the cinetheodolite is fed back to the operator through the handwheel to provide the necessary sensitivity to the cinetheodolite movement.

During tracking, elevational and azimuthal angles are printed on the edge of the film exposed through the main telescope in a binary coded decimal (BCD) format. The target appears on the frame of the film, with its proximity to the center depending on the operator's skill. If the target is dead center, the angles on the edge of the film are correct. If the target is off center, a correction factor must be applied to the printed data when the film has been processed and read frame by frame.

Figure 2:
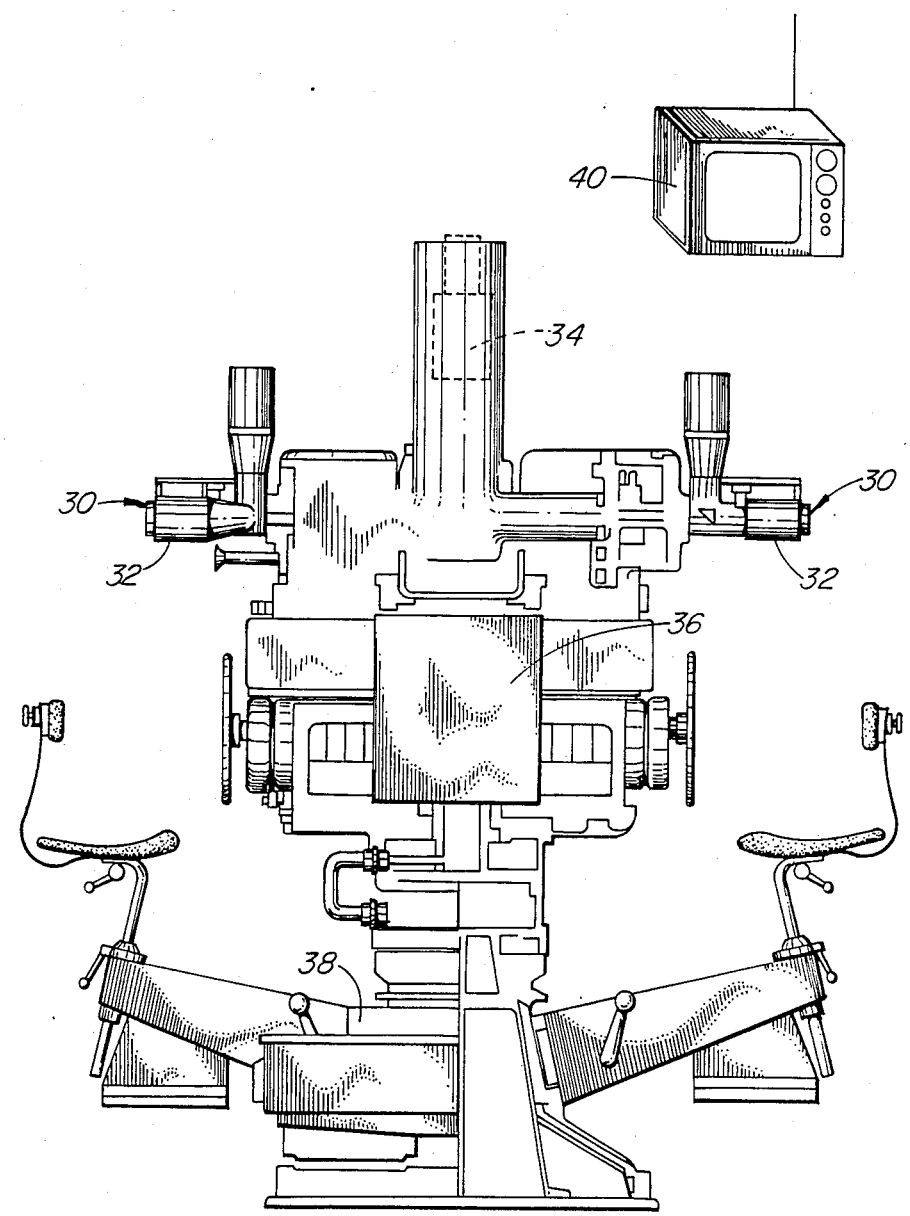
FIG. 2 is a view like FIG. 1 showing an embodiment of the present invention mounted on the cinetheodolite.

To provide a realistic, inexpensive simulation, the simulator of the present invention is constructed around the tracking device. In the embodiment illustrated in FIG. 2, the simulator includes two video monitors 30 installed on the sighting telescope eyepieces of the cinetheodolite. The monitor is a 1½ inch (3.8 cm.) video monitor typically used as a camera viewfinder. The monitor is aligned in front of the sighting telescope eyepiece. Each operator station also includes a control box 32 with appropriate control push buttons and light emitting diode (LED) displays for various functions that are most conveniently performed by the operator at his station.

The simulator also includes a solid state video camera 34 mounted on the cinetheodolite main telescope. In the cinetheodolite in question, the mount is already present and has an alignment adjustment mechanism permitting alignment of the camera image with that of the sighting telescopes. The camera field of view and that of each of the sighting telescopes is similar.

A main station 36 is mounted on the cinetheodolite at a convenient location. This is a metal box containing a microcomputer board, a graphics controller board, a video interface board, a front panel interface board, a voice synthesizer module, an RF amplifier with antenna and power supplies. The front panel of the main station is illustrated in FIG. 3 and will described more fully in the following.

A video recorder 38 with a protective housing is installed on the cinetheodolite as well. The illustrated simulator also includes a television monitor 40 which can be installed inside the cinetheodolite dome or at some other convenient location. This monitor enables an instructor to follow a test run and to replay it afterwards from the video recorder for debriefing and training purposes.

In a simulator operation, an operator takes his place on the cinetheodolite after selecting the mission parameters on the main station 36. The cinetheodolite is controlled as in actual test runs with the exception of looking at the small monitors installed in front of the telescope eyepieces instead of the eyepieces themselves. One or two operators may use the simulator simultaneously.

Figure 3:
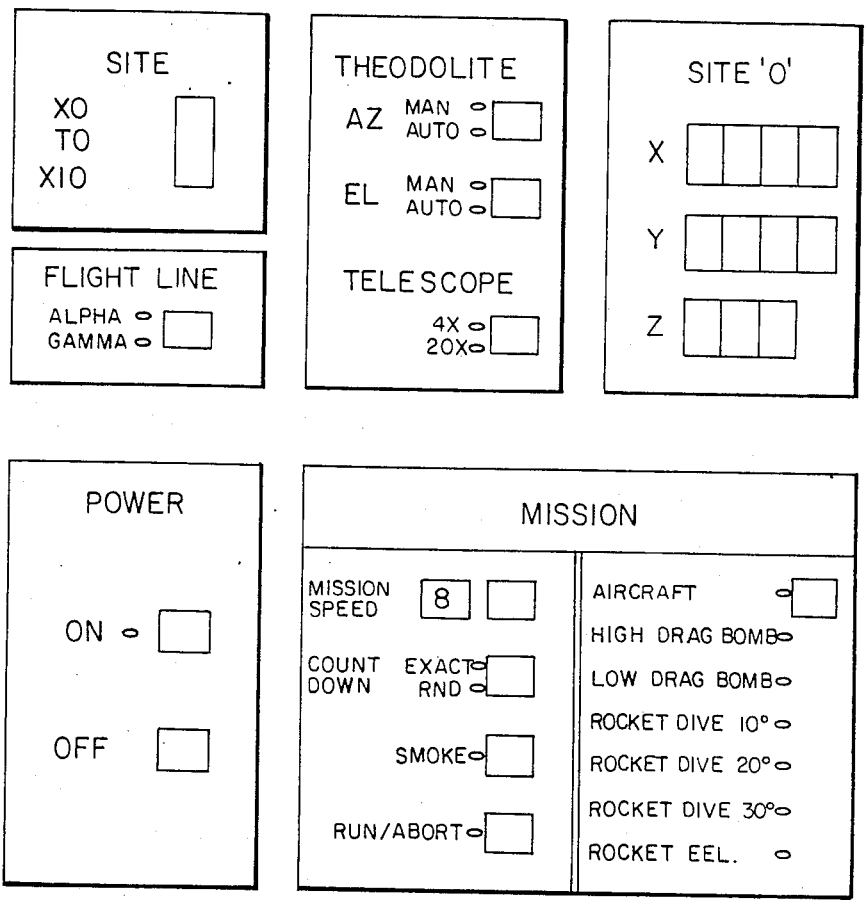
FIG. 3 is a layout of the main station control panel of the embodiment of FIG. 2.

To set the simulation parameters and to control the execution of the simulation, the operators use the various switches located on the main station front panel as illustrated in FIG. 3 and on the two operator stations. A simulation can be started by pressing a "run/abort" button on the main station front panel or an auxiliary "run/abort" button on an operator's station. To complement the visual information given by the main station and the operator's stations, the voice synthesizer inside the main station provides vocal messages to the operators.

An operator can select a site that he wishes to simulate by setting the thumb wheel on the panel marked "site". Positions 1–10 correspond to respective sites at appropriate locations on a testing range. Position 0 corresponds to a fictitious site with coordinates that are entered on the thumb wheels on the panel marked "site 0".

If a site is selected for a simulation that differs from the actual site of the cinetheodolite device, the background seen by the operator will differ from what is normally seen at the simulated site. Apart from this, however, the simulation is the same.

The main station front panel also includes a subpanel providing for the selection of a flight line. The simulator allows selection of a flight line among the ones most often flown by the aircraft.

The cinetheodolite orientation drives can be operated in either a manual or an automatic mode. In the manual mode, the orientation of the theodolite is controlled by the operators' handwheels, while in the automatic mode, the microcomputer controls the orientation of the theodolite. The azimuth and elevation can be independently controlled either automatically or manually. Pushbutton switches on the main station panel and operator control boxes allow this selection.

On the cinetheodolite sighting telescopes, two optics can be used, one with a 4× optical gain and the other with a 20× gain. Since the video camera lens has a fixed focal length, the simulator does not provide a simulation of the two gains. The 4×/20× feature provided by the pushbutton labelled "telescope" on the main station front panel and operator control boxes allows a change in the target apparent size and speed in order to simulate the selected magnification. The background image is not affected.

In the illustrated simulator, there are seven different missions that can be selected. These are as follows:
(i) aircraft flying at constant speed and altitude;
(ii) high drag bomb dropped from aircraft;
(iii) low drag bomb dropped from aircraft;
(iv) rocket fired from aircraft, 10° dive angle;
(V) rocket fired from aircraft, 20° dive angle;
(vi) rocket fired from aircraft, 30° dive angle;
(vii) rocket fired from hovering helicopter.

Associated with the mission selection is a mission speed selection that allows the operator to choose different target speeds from 0.5 to 1 via steps of 0.1. 1 is considered the normal speed. By successively pressing the button marked "mission speed", the digital display scans all of the possible values.

With all missions in which a rocket is fired or a bomb is dropped, the operator may select one of three possibilities in a countdown option. These are no countdown, an exact countdown and a random countdown. If an exact countdown is selected, the voice synthesizer will give an audible countdown starting 10 seconds before the bomb or rocket is launched. If a random countdown is selected, an inaccurate countdown will be given with a possible offset of three seconds, either plus or minus. In any case, a tone is sounded at the exact moment of launch, which is the situation with actual test runs.

The illustrated embodiment of the invention also includes a "smoke option" that can be used in conjunction with rocket simulations. Since rockets accelerate rapidly, their angular acceleration exceeds the tracking capability of the cinetheodolite. The rocket thus leaves the operator's field of view. A trail of smoke left by the rocket assists an operator in reacquiring the target. The smoke option when selected leaves a dotted line between the launch point and the rocket position.

Figure 4:
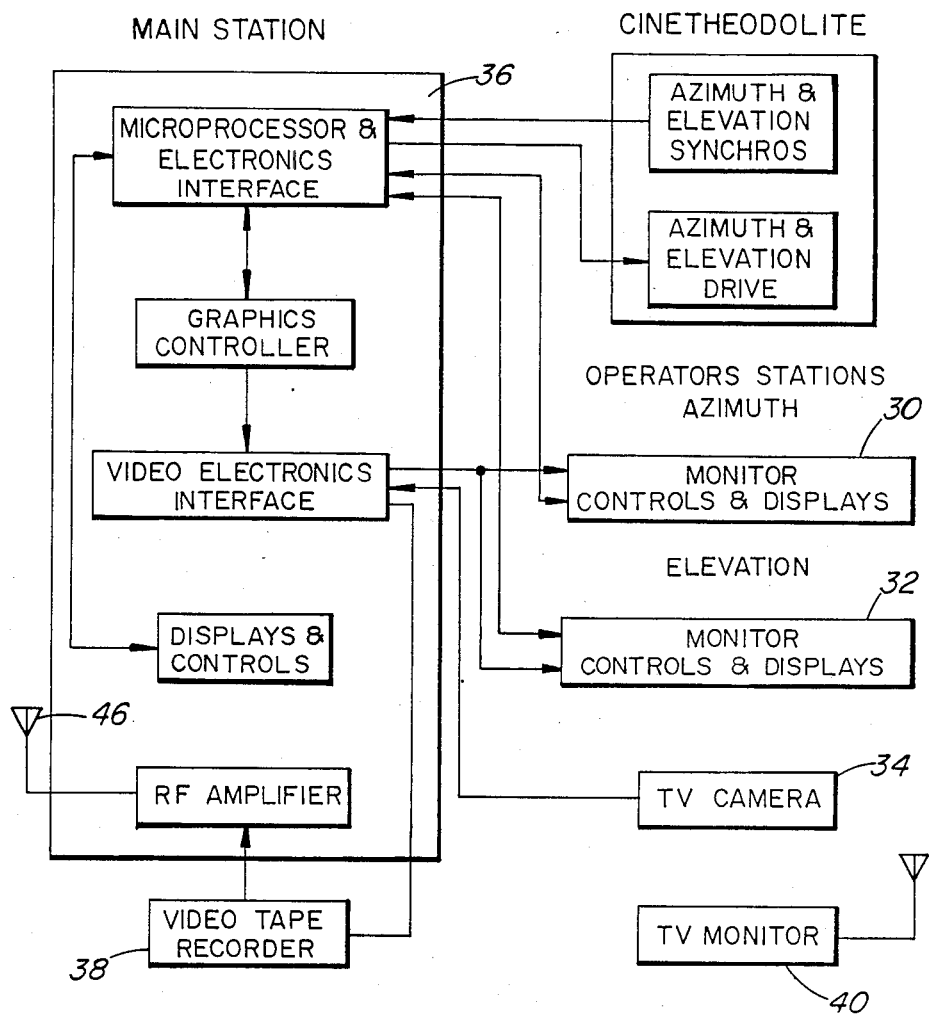
FIG. 4 is a block diagram of the simulator.

A block diagram of the tracking simulator is illustrated in FIG. 4. As illustrated the television camera 34 mounted on the cinetheodolite main telescope feeds a video signal to a video electronics interface at the main station 36. This signal, which provides a background image, is mixed with a signal representing a drawings of a synthetic target generated by a graphics controller. The resulting composite image is sent to the operator monitors 30 and to the video tape recorder 38. The video tape recorder puts out the signal on radio frequency (RF) to an RF amplifier at the main station. This serves to broadcast the signal via antenna 46. The broadcast signal is received by the television monitor 40.

The main station also includes a microprocessor that receives cinetheodolite angle signals from the azimuth and elevation synchros of the cinetheodolite and target signals from the graphics controller. In automatic operation, the microprocessor sends signals to the drive motors to control the movement and orientation of the cinetheodolite. The microprocessor, through its electronics interface, receives signals from the various control switches and sends signals to the display panels of the main station and the operators' stations. Additionally, the microprocessor sends commands to the graphics controller to generate signals producing the synthetic targets on the monitors.

In use, the microprocessor computes a score for each operator which is approximately the percentage of time that the operator is "on target". The score is displayed at the end of each simulation and is also given by audible means via a voice synthesizer.

The simulator of the illustrated embodiment uses the standard NTSC video signal. This permits any commercial piece of equipment to be hooked up to the system for recording or monitoring purposes.

While one embodiment of the invention is described in the foregoing, it is to be understood that other embodiments are equally possible. The scope of the invention is to be ascertained solely by reference to the appended claims.

The embodiments of the invention in which an exclusive property or priviledge is claimed are defined as follows:

1. A simulator for use with an optical tracking device of the type having a target tracking sight and at least one operator's station including a viewer for viewing through the sight and sight orientation control means for orienting the sight, the simulator comprising:
    video monitor means associated with the viewer for displaying video images to an operator;
    a television camera mounted for movement with the sight and with substantially the same field of view as the sight;
    sight orientation monitoring means connected to the tracking device for monitoring the orientation of the sight;
    graphics generator means for generating a video target image;
    electrical circuit means connecting the television camera and the graphics generator means to the monitor to generate at the monitor a composite image of the camera field view with a superimposed target image, the circuit means further connecting the sight orientation monitoring means to the graphics generator to vary the location of the target image with respect to the field image according to the sight orientation.

2. A tracking device according to claim 1, including a video tape recorder and means connecting the video tape recorder to the graphics generator and the camera to record the field and target images as they appear at the video monitor means.

3. A tracking device according to claim 1, including an instructor's station with a video monitor for observing the field and target images as they appear at the video monitor means.

4. A tracking device according to claim 1, including means for computing a score representing the percentage of time that the sight is centered on the target image.

5. A tracking device according to claim 4, including means for displaying the computed score when a simulation is completed.

6. A tracking device according to claim 1, including countdown means for generating an audible countdown to a target launch.

7. A tracking device according to claim 6, wherein the countdown means include a voice synthesizer.

8. A tracking device according to claim 1, wherein the sight is a telescope and the viewer is an eyepiece.

9. A tracking device according to claim 8, wherein the tracking device is a cinetheodolite.

10. A tracking device according to claim 9, wherein the sight orientation control means includes separate orientation controls for elevation and azimuth and including two operator stations, each including a respective one of the orientation controls and a respective video monitor.

11. A tracking device according to claim 10, further including selectively operable automatic orientation means responsive to operation of the graphics generator means to operate at least one of the elevation and azimuth controls automatically.

12. A tracking device according to claim 1, wherein the circuit means include means for selecting parameters of a simulation to be performed.

13. A tracking device according to claim 2, wherein the parameters include target size and speed, the size and speed being selectable to represent different magnification levels of the sight.

14. A tracking device according to claim 2, wherein the parameters include the site of the tracking device with respect to a path of travel of the target image.

15. A tracking device according to claim 4, wherein the parameters include a flight line.

16. A tracking device according to claim 5, wherein the parameters include target image speed.

* * * * *